US006987709B2

(12) United States Patent
Phillips

(10) Patent No.: US 6,987,709 B2
(45) Date of Patent: Jan. 17, 2006

(54) DEVICE TIME SETTING METHOD, PROGRAM AND SYSTEM

(75) Inventor: Quintin T. Phillips, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 10/356,486

(22) Filed: Feb. 3, 2003

(65) Prior Publication Data

US 2004/0151070 A1 Aug. 5, 2004

(51) Int. Cl.
*G04C 13/00* (2006.01)
*G04C 11/00* (2006.01)
*G05B 11/01* (2006.01)

(52) U.S. Cl. .......................................... 368/46; 700/16

(58) Field of Classification Search ................. 368/46, 368/47, 50; 700/14, 16; 702/176, 178, 187; 370/507; 375/133, 134, 357
See application file for complete search history.

(56) References Cited

U.S. PATENT DOCUMENTS

| | | | | |
|---|---|---|---|---|
| 4,866,606 | A * | 9/1989 | Kopetz | 713/375 |
| 5,040,158 | A * | 8/1991 | Lee et al. | 368/10 |
| 5,315,566 | A * | 5/1994 | Stein | 368/46 |
| 5,402,394 | A * | 3/1995 | Turski | 368/10 |
| 5,408,506 | A * | 4/1995 | Mincher et al. | 375/134 |
| 5,666,330 | A * | 9/1997 | Zampetti | 368/47 |
| 5,848,028 | A * | 12/1998 | Burklin | 368/46 |
| 6,157,217 | A * | 12/2000 | Zittlau et al. | 326/93 |
| 6,157,957 | A * | 12/2000 | Berthaud | 709/248 |
| 6,564,288 | B2 * | 5/2003 | Olarig et al. | 711/105 |

* cited by examiner

*Primary Examiner*—Andrew H. Hirshfeld
*Assistant Examiner*—Leo T. Hinze

(57) ABSTRACT

A method, system and program product for automatically determining a time for a device connected to a network, the method comprising: obtaining time samples from a plurality of different electronic devices on the network; normalizing the time samples; selecting a time for the device in accordance with an algorithm that utilizes the time samples; and resetting a clock in accordance with the selected time.

47 Claims, 2 Drawing Sheets

DEVICE TIME SETTING METHOD, PROGRAM AND SYSTEM

BACKGROUND OF THE INVENTION

Timely information for setting the current time for devices connected to a network may be determined using a number of different methods. In a first method of time determination, a device such as a printer may have an on-board clock powered by a battery, which may be installed in the device at the time of manufacture to calculate the current time. The current time is recorded and the device continues to provide the time for several years—until the battery is exhausted. In an alternative method, the battery may be supplanted by a capacitor. Installation of the device requires the time to be set. The capacitor then provides a trickle charge for several days, after power to the device has been disconnected. When power is restored, if there is still charge in the capacitor, the time is retained. However, if the charge has been depleted, the clock must be reset. Both of these methods incur hardware cost to the product and impose environmental requirements due to end-of-life disposal issues. Thus, an alternative time setting and maintenance method is needed.

SUMMARY OF THE INVENTION

One embodiment of the present invention is a method for automatically determining a time for a device connected to a network, comprising: obtaining time samples from a plurality of different electronic devices on the network; normalizing the time samples; selecting a time for the device in accordance with an algorithm that utilizes the time samples; and resetting a clock in accordance with the selected time.

In a further embodiment of the present invention, a program product is provided for automatically determining a time for a device connected to a network, comprising machine readable program code for causing, when executed, a machine to perform the following method: obtaining time samples from a plurality of different electronic devices on the network; normalizing the time samples; selecting a time for the device in accordance with an algorithm that utilizes the time samples; and resetting a clock in accordance with the selected time.

In a yet further embodiment of the present invention, a system is provided for automatically determining a time for a device connected to a network, comprising: a time sample extractor for obtaining time samples from a plurality of different electronic devices on the network; a normalizer for normalizing the obtained time samples; and a processor for selecting a time for the device in accordance with an algorithm and resetting a clock in accordance with the selected time.

DETAILED DESCRIPTION OF THE EMBODIMENTS

Figure 1:
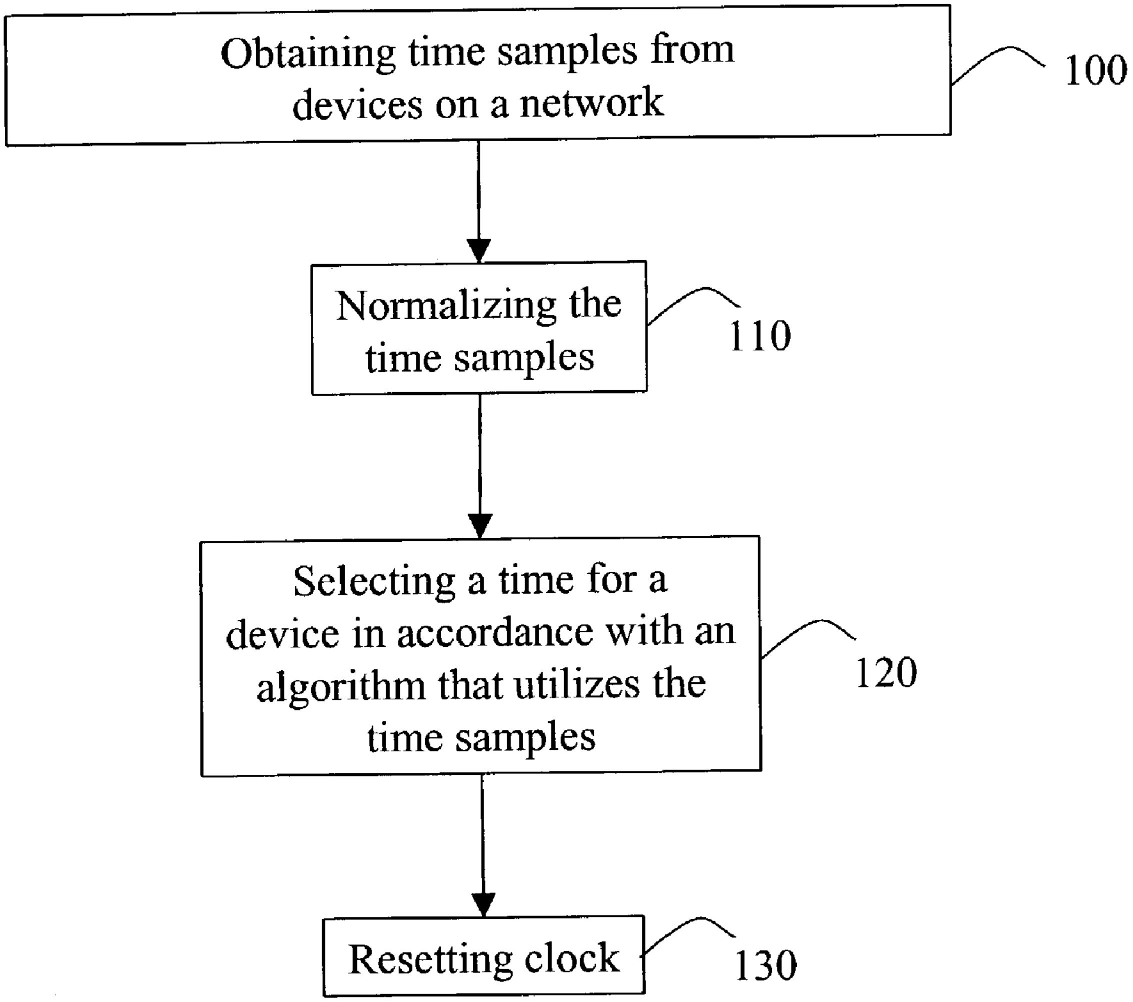
FIG. 1 is a flowchart of one embodiment of the present invention.

The present invention is directed to extracting current time information from incoming interactions with other electronic devices, and using this time as the current time.

The device may store the time from such interactions and then use that stored time in conjunction with a counting algorithm to determine subsequent times. However, if the incoming time is incorrect, due to the electronic device from which the time was taken having the wrong time set, then incorrect time information results. This can be problematic in cases where warranty, guarantee, or other service intervals are determined based on time.

The present invention is designed to reduce the risk of such an event occurring by either sampling multiple incoming messages for time samples and/or interrogating multiple other devices on the network for time samples. The time samples are then analyzed using an algorithm to determine and/or select a more accurate time.

The invention is described below with reference to drawings. These drawings illustrate certain details of specific embodiments that implement the systems and methods and programs of the present invention. However, describing the invention with drawings should not be construed as imposing, on the invention, any limitations that may be present in the drawings. The present invention contemplates methods, systems and program products on any computer readable media for accomplishing its operations. The embodiments of the present invention may be implemented using an existing computer processor on the device requiring the time setting operation, or by a special purpose computer processor incorporated for this or another purpose in or associated with the device.

As noted above, embodiments within the scope of the present invention include program products on computer-readable media and carriers for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of method steps which may be implemented in one embodiment by a program product including computer-executable instructions, such as program modules, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The present invention is intended to be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

Referring now to FIG. 1, one embodiment of a method and program product for implementing the present invention is shown. Referring to block 100, a first step is performed of obtaining time samples from devices on a network. By way of example, the samples may be obtained from incoming job requests from a plurality of computers. Alternatively, such samples may be obtained by sending electronic queries to devices on the network to obtain time samples from those devices.

Referring now to block 110, the received samples are normalized in order convert the time samples to the same time scale. A counting algorithm may also be used in conjunction with this normalization in order to facilitate this conversion. By way of example, such normalization could comprise selection of the average time or the statistical mode of the time samples collected.

Referring now to block 120, the step is performed of selecting a time for a device in accordance with an algorithm that utilizes the time samples. A variety of different algorithms and techniques may be utilized to select the time. By way of example, the time samples may be averaged, and the resulting average time may then be utilized as the appropriate time. In order to improve the accuracy of this averaging algorithm, outlier time samples may be deleted before the average is calculated. For example 10% of the outlier points may be deleted/truncated before the average is calculated. Such deletion/truncation has the advantage that a single device on the network with a significantly different time will not skew the calculation of the time. Alternatively, the sampled times could be grouped into bins of pre-selected size (for example two minute intervals). Accordingly, a histogram of time bins is created based on frequency of occurrence and time distribution. The time bin with the most number of time samples therein may be used to determine the time for the device.

Referring now to block 130, a device clock may be reset to the selected time determined in block 120. In one embodiment, the internal clock of the device may be reset only if a pre-determined criteria is met, such as for example, that there is a deviation between the initial time set in the device and the selected time by more than a pre-determined amount, such as, for example one minute. An additional or alternative criteria which may be implemented is that a predetermined number of time samples must have been obtained before the time for the device is reset.

Figure 2:
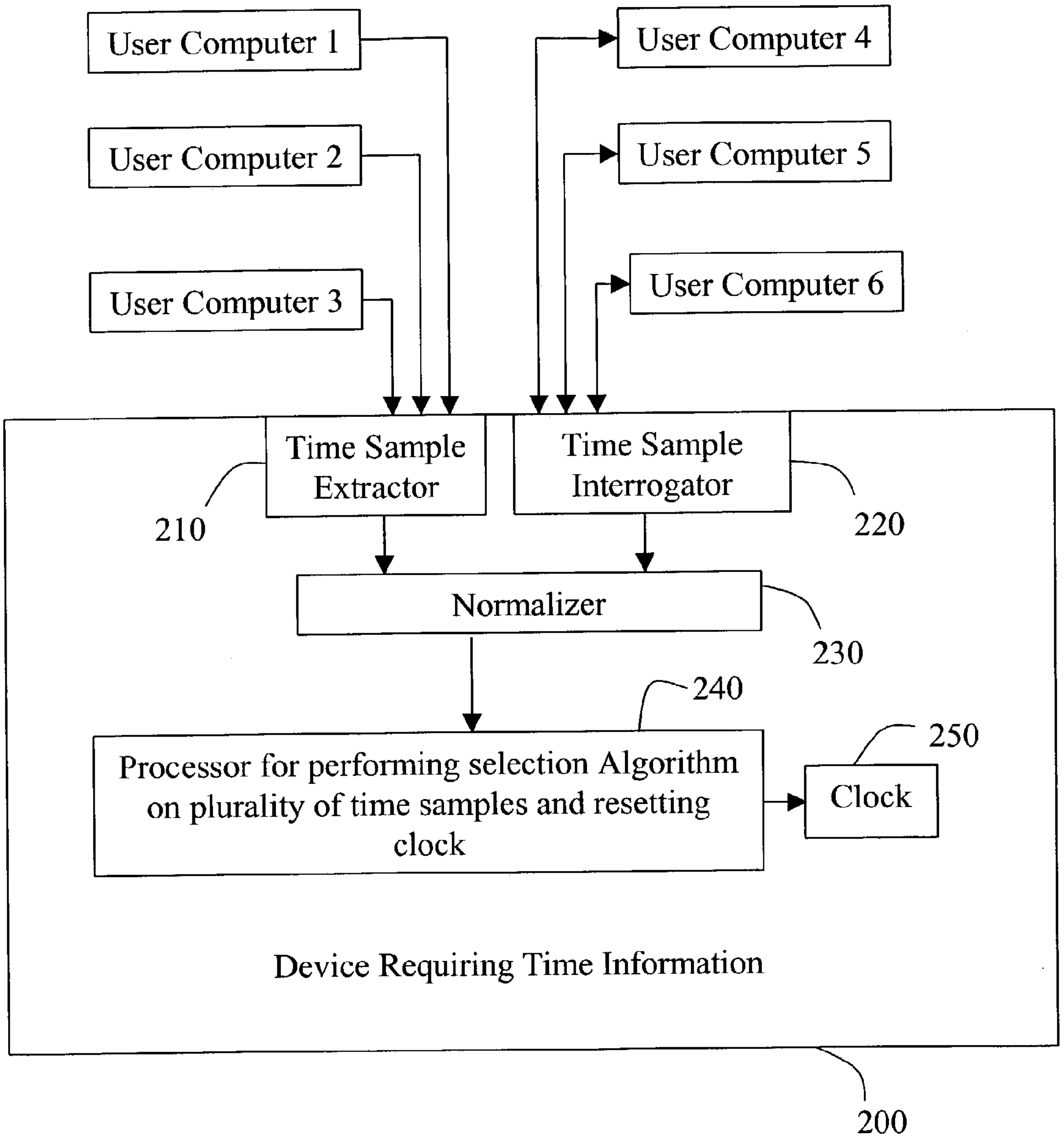
FIG. 2 is a schematic block diagram illustrating a system embodiment for implementing the present invention.

Referring now to FIG. 2, an embodiment of a system for implementing the present invention is shown. Block 200 represents the system included in or associated with the device needing the time set. Within block 200 is a time sample extractor block 210 and a time sample interrogator block 220. The time sample extractor block 210 may be implemented by programming code for extracting time data from incoming job requests. Typically such time data may be in the job header. Alternatively, such time data may be in the bi-directional communication messages or in a time stamp. From FIG. 2, it can be seen that incoming job requests from user computer 1, user computer 2, and user computer 3 are applied to the time sample extractor 210 to extract time data samples therefrom.

The time sample interrogator 220 may be implemented by programming code to send query messages to user computer 4, user computer 5, and user computer 6 to obtain time data therefrom. The time samples from the time sample extractor 210 and/or the time sample interrogator 220 are applied to a normalizer 230. The normalizer 230 may comprise programming code structure and a counting algorithm for placing the time samples in a single time scale.

Referring now to block 240, a processor is shown for performing a selection algorithm on the plurality of time samples and then generating a reset signal for resetting a clock 250. As noted previously, this selection algorithm may comprise, for example, an averaging algorithm, an averaging algorithm that truncates outlier time samples (time samples at the edges of the group), or an algorithm for generating a histogram analysis resulting in time bins, coupled with a selection of the time bin with the greatest number of time samples therein.

Note that an exemplary system 200 for implementing would also typically include a system memory (not shown), which may be separate from the device or shared with the device. The system memory may include read only memory (ROM) and random access memory (RAM). The system may include or share a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage for computer-executable instructions, data structures, program modules and other data for the system. Program code comprising one or more program modules as well as data may be stored on the hard disk, magnetic disk, optical disk, ROM or RAM. A system bus (not shown) is also typically used to couple various system components including the system memory to the processor 240. Note that the system bus may be implemented by connecting to the system bus for the device.

An embodiment of a method for operating the device of FIG. 2 may comprise the steps of powering up the device 200, then setting an internal clock for the device in accordance with a first one of the time samples obtained, followed by changing the setting for the internal clock 250 of the device only if a predetermined criteria is met. By way of example, this predetermined criteria may be that a selected time determined in accordance with the algorithm of the processor 240 deviates from the initial time set for the device by more than a predetermined amount, such as one minute. Alternatively, or in addition, another criteria may be imposed that a predetermined number of time samples have been obtained before the internal clock is reset. Note that the outlier time samples would typically be maintained in the histogram embodiment in order to build up the histogram.

Accordingly, it can be seen that the time determined by the device would accurately reflect the network operating environment in question. The device would be protected from the chance event in which a single external user computer interrogated by or sending a communication to the device in question has a significantly skewed time. Some embodiments of the present method may be implemented to use minimal computing power, and some embodiments may be implemented so as not to require environmentally challenging power supply components.

An algorithm may be included to ensure that only a single time sample is taken from any given device on the network. Such an algorithm would prevent multiple samples from the same external device on the network from skewing the time distribution in the histogram or skewing the average due to multiple job requests from that single device.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for automatically determining a time for a device connected to a network, comprising:

obtaining time samples from a plurality of different electronic devices on the network;

normalizing the time samples in order to convert the time samples into a single time scale;

selecting a time for the device in accordance with an algorithm that utilizes the time samples, wherein the selecting step comprises grouping the time samples into time bins of a predetermined time period and selecting the time bin with the largest number of samples; and resetting a clock in accordance with the selected time.

2. The method as defined in claim 1, wherein the selecting step comprises:

calculating an average from the time samples; and selecting the average as the time for the device.

3. The method as defined in claim 1, wherein the selecting step comprises:

calculating an average from a plurality of the time samples after deleting at least one outlier time sample.

4. The method as defined in claim 3, wherein about 10% or less of the time samples are deleted as outlier time samples.

5. The method as defined in claim 1, wherein only one time sample is used from any given device on the network.

6. The method as defined in claim 1, wherein the obtaining time samples step comprises:

obtaining a time sample from a received job request.

7. The method as defined in claim 1, wherein the obtaining time samples step comprises:

interrogating a plurality of electronic devices on the network to obtain the time samples.

8. The method as defined in claim 1, wherein the time samples are obtained by both interrogating a plurality of electronic devices on the network and obtaining time samples from received job requests.

9. The method as defined in claim 1, further comprising:

powering up the device;

initially setting an internal clock for the device in accordance with one of the time samples obtained; and changing the setting for the internal clock of the device to the selected time only if a predetermined criteria is met.

10. The method as defined in claim 9, wherein the criteria is that a predetermined number of time samples have been obtained.

11. The method as defined in claim 9, wherein the criteria is that selected time deviates from the initial setting of the internal clock by at least a predetermined amount.

12. A system for automatically determining a time for a device connected to a network, comprising:

a time sample extractor for obtaining time samples from a plurality of different electronic devices on the network;

a normalizer for normalizing the obtained time samples in order to convert the time samples into a single time scale; and a processor for selecting a time for the device in accordance with an algorithm and resetting a clock in accordance with the selected time, wherein the processor is configured to group the time samples into time bins of a predetermined time period and select the time bin with the largest number of samples.

13. A program product for automatically determining a time for a device connected to a network, comprising machine readable program code for causing, when executed, a machine to perform the following method:

obtaining time samples from a plurality of different electronic devices on the network;

normalizing the time samples in order to convert the time samples into a single time scale;

selecting a time for the device in accordance with an algorithm that utilizes the time samples, wherein the program code for the selecting step includes code for grouping the time samples into time bins of a predetermined time period and selecting the time bin with the largest number of samples; and resetting a clock in accordance with the selected time.

14. The program product as defined in claim 13, wherein the program code for the selecting step includes code for:

calculating an average from the time samples; and selecting the average as the time for the device.

15. The program product as defined in claim 13, wherein the program code for the selecting step includes code for:

calculating an average from a plurality of the time samples after deleting at least one outlier time sample.

16. The program product as defined in claim 15, wherein about 10% or less of the time samples are deleted as outlier samples.

17. The program product as defined in claim 13, wherein program code is included to use only one time sample from any given device on the network.

18. The program product as defined in claim 13, wherein the program code for obtaining time samples step includes code for:

obtaining a time sample from a received job request.

19. The program product as defined in claim 13, wherein the program code for obtaining time samples step includes code for:

interrogating a plurality of electronic devices on the network to obtain the time samples.

20. The program product as defined in claim 13, wherein the time samples are obtained by both interrogating a plurality of electronic devices on the network and obtaining time samples from received job requests.

21. The program product as defined in claim 13, further comprising program code for:

powering up the device;

initially setting an internal clock for the device in accordance with one of the time samples obtained; and changing the setting for the internal clock of the device to the selected time only if a predetermined criteria is met.

22. The program product as defined in claim 21, wherein the criteria is that a predetermined number of time samples have been obtained.

23. The program product as defined in claim 21, wherein the criteria is that the selected time deviates from the initial setting of the internal clock by at least a predetermined amount.

24. A system for automatically determining a time for a device connected to a network, comprising:

means for obtaining time samples from a plurality of different electronic devices on the network;

means for normalizing the time samples in order to convert the time samples into a single time scale;

means for selecting a time for the device in accordance with an algorithm that utilizes the time samples;

means for grouping the time samples into time bins of a predetermined time period and for selecting the time bin with the largest number of samples; and means for resetting a clock in accordance with the selected time.

25. The system as defined in claim 24, wherein only one time sample is used from any given device on the network.

26. The system as defined in claim 24, wherein the means for obtaining time samples obtains a time sample from a received job request.

27. The system as defined in claim 24, wherein the means for obtaining time samples interrogates a plurality of electronic devices on the network to obtain the time samples.

28. The system as defined in claim 24, wherein the means for obtaining time samples obtains time samples by both interrogating a plurality of electronic devices on the network and obtains time samples from received job requests.

29. The system as defined in claim 24, further comprising:

means for powering up the device;

means for initially setting an internal clock for the device in accordance with one of the time samples obtained; and means for changing the setting for the internal clock of the device to the selected time only if a predetermined criteria is met.

30. A method for automatically determining a time for a device connected to a network, comprising:

obtaining time samples from a plurality of different electronic devices on the network;

normalizing the time samples;

selecting a time for the device in accordance with an algorithm that utilizes the time samples, including grouping the time samples into time bins of a predetermined time period and selecting the time bin with the largest number of samples; and resetting a clock in accordance with the selected time.

31. The method as defined in claim 30, wherein the selecting step comprises:

calculating an average from the time samples; and selecting the average as the time for the device.

32. The method as defined in claim 30, wherein the selecting step comprises:

calculating an average from a plurality of the time samples after deleting at least one outlier time sample.

33. The method as defined in claim 32, wherein about 10% or less of the time samples are deleted as outlier time samples.

34. The method as defined in claim 30, wherein only one time sample is used from any given device on the network.

35. The method as defined in claim 30, wherein the obtaining time samples step comprises:

obtaining a time sample from a received job request.

36. The method as defined in claim 30, wherein the obtaining time samples step comprises:

interrogating a plurality of electronic devices on the network to obtain the time samples.

37. The method as defined in claim 30, wherein the time samples are obtained by both interrogating a plurality of electronic devices on the network and obtaining time samples from received job requests.

38. The method as defined in claim 30, further comprising:

powering up the device;

initially setting an internal clock for the device in accordance with one of the time samples obtained; and changing the setting for the internal clock of the device to the selected time only if a predetermined criteria is met.

39. The method as defined in claim 38, wherein the criteria is that selected time deviates from the initial setting of the internal clock by at least a predetermined amount.

40. The method as defined in claim 38, wherein the criteria is that a predetermined number of time samples have been obtained.

41. A system for automatically determining a time for a device connected to a network, comprising:

a time sample extractor for obtaining time samples from a plurality of different electronic devices on the network;

a normalizer for normalizing the obtained time samples; and a processor for selecting a time for the device in accordance with an algorithm and resetting a clock in accordance with the selected time, wherein the processor is further configured for grouping the time samples into time bins of a predetermined time period and for selecting the time bin with the largest number of samples.

42. The system as defined in claim 41, wherein only one time sample is used from any given device on the network.

43. The system as defined in claim 41, wherein the time sample extractor obtains a time sample from a received job request.

44. The system as defined in claim 41, wherein the time sample extractor interrogates a plurality of electronic devices on the network to obtain the time samples.

45. The system as defined in claim 41, wherein the time sample extractor obtains time samples by both interrogating a plurality of electronic devices on the network and obtains time samples from received job requests.

46. The system as defined in claim 41, further comprising:

wherein the processor is configured to initially set an internal clock for the device in accordance with one of the time samples obtained and change the setting for the internal clock of the device to the selected time only if a predetermined criteria is met.

47. A system for automatically determining a time for a device connected to a network, comprising:

means for obtaining time samples from a plurality of different electronic devices on the network;

means for normalizing the time samples;

means for selecting a time for the device in accordance with an algorithm that utilizes the time samples, including means for grouping the time samples into time bins of a predetermined time period and for selecting the time bin with the largest number of samples; and means for resetting a clock in accordance with the selected time.

* * * * *